US011747484B2

(12) United States Patent
Oshita et al.

(10) Patent No.: US 11,747,484 B2
(45) Date of Patent: Sep. 5, 2023

(54) ELECTRONIC TIMEPIECE, INFORMATION UPDATE CONTROL METHOD AND STORAGE MEDIUM

(71) Applicant: CASIO COMPUTER CO., LTD., Tokyo (JP)

(72) Inventors: Yuuki Oshita, Tokyo (JP); Kazuho Kyou, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 506 days.

(21) Appl. No.: 16/836,999

(22) Filed: Apr. 1, 2020

(65) Prior Publication Data

US 2020/0319348 A1  Oct. 8, 2020

(30) Foreign Application Priority Data

Apr. 2, 2019 (JP) ................................. 2019-070299

(51) Int. Cl.
*G01S 19/27* (2010.01)
*G04G 19/02* (2006.01)
(Continued)

(52) U.S. Cl.
CPC .............. *G01S 19/27* (2013.01); *G01S 19/07* (2013.01); *G01S 19/258* (2013.01); *G01S 19/34* (2013.01); *G04G 19/02* (2013.01); *G04R 20/00* (2013.01)

(58) Field of Classification Search
CPC ........ G01S 19/34; G01S 19/27; G01S 19/256; G01S 19/258; G04R 20/00–02
See application file for complete search history.

(56) References Cited

U.S. PATENT DOCUMENTS 7,236,126 B2 *  6/2007  Jeon ........................ G01S 19/05
                                                          342/357.62
7,436,357 B2 * 10/2008  Wang ...................... G01S 19/34
                                                          342/357.74
(Continued)

FOREIGN PATENT DOCUMENTS

JP       2010-127672 A     6/2010

OTHER PUBLICATIONS

Kaplan, Elliott D. et al., "Understanding GPS Principles and Applications", Artech House, 2nd ed., 2006 (Year: 2006) (Year: 2006).*

*Primary Examiner* — Cassi J Galt
(74) *Attorney, Agent, or Firm* — Scully, Scott, Murphy & Presser, P.C.

(57) ABSTRACT

An electronic timepiece includes a radio wave receiver, a communication unit, a memory and a processor. The radio wave receiver receives radio waves from positioning satellites. The communication unit communicates with an external device. The memory stores a program and predicted positional information on the positioning satellites. Based on the program stored in the memory, the processor shifts the timepiece between a normal operation state and a power saving state in which operation of the timepiece is restricted, depending on a status of the timepiece. In response to an elapsed time from a valid period of the predicted positional information exceeding a predetermined reference time during the power saving state, the processor causes the communication unit to receive updated data of the predicted positional information and other information from the external device when shifting the timepiece from the power saving state to the normal operation state.

14 Claims, 7 Drawing Sheets

(51) Int. Cl.
*G01S 19/07* (2010.01)
*G01S 19/34* (2010.01)
*G04R 20/00* (2013.01)
*G01S 19/25* (2010.01)

(56) References Cited

U.S. PATENT DOCUMENTS

| | | | | |
|---|---|---|---|---|
| 8,558,738 B2* | 10/2013 | Ladd | ............... | G01S 19/235 |
| | | | | 342/357.65 |
| 8,823,587 B2* | 9/2014 | Abraham | ............ | G01S 19/27 |
| | | | | 342/357.66 |
| 10,649,097 B2* | 5/2020 | Nozawa | ............ | G01S 19/48 |
| 2007/0159391 A1* | 7/2007 | Kuo | ............ | G01S 19/258 |
| | | | | 342/357.64 |
| 2008/0183384 A1* | 7/2008 | Gaal | ............ | G01S 19/25 |
| | | | | 342/357.29 |
| 2014/0292564 A1* | 10/2014 | Park | ............ | G01S 19/14 |
| | | | | 342/357.2 |

\* cited by examiner

ELECTRONIC TIMEPIECE, INFORMATION UPDATE CONTROL METHOD AND STORAGE MEDIUM

CROSS-REFERENCE TO RELATED APPLICATIONS

This application is based upon and claims the benefit of priority under 35 USC 119 of Japanese Patent Application No. 2019-070299 filed on Apr. 2, 2019 the entire disclosure of which, including the description, claims, drawings, and abstract, is incorporated herein by reference in its entirety.

BACKGROUND OF THE INVENTION

Field of the Invention

The present disclosure relates to an electronic timepiece, an information update control method and a storage medium.

Description of the Related Art

There is a satellite positioning system that receives radio waves from positioning satellites and identifies the date and time and the current position.

In order to identify the current position, positional information (ephemeris(des)) on positioning satellites is needed. The positional information is included in radio waves transmitted from positioning satellites. However, it takes a long time to receive positional information from positioning satellites, which increases power consumption, and also it takes a long time to identify the current position first time. To deal with these, as disclosed in JP 2010-127672 A, there is a technology that obtains predicted positional information (predicted ephemeris) on positioning satellites in advance via a network and uses the predicted positional information when not holding positional information.

BRIEF SUMMARY OF THE INVENTION

According to a first aspect of the present disclosure, there is provided an electronic timepiece including:
a radio wave receiver receiving radio waves from positioning satellites;
a communication unit communicating with an external device;
a memory storing a program and predicted positional information on the positioning satellites; and
a processor, based on the program stored in the memory, shifting the electronic timepiece between a normal operation state and a power saving state in which operation of the electronic timepiece is restricted, depending on a status of the electronic timepiece, and
in response to an elapsed time from a valid period of the predicted positional information exceeding a predetermined reference time during the power saving state, causing the communication unit to receive updated data of the predicted positional information and other information from the external device when shifting the electronic timepiece from the power saving state to the normal operation state.

According to a second aspect of the present disclosure, there is provided an information update control method of an electronic timepiece including: a radio wave receiver receiving radio waves from positioning satellites; a communication unit communicating with an external device; and a memory storing predicted positional information on the positioning satellites, the information update control method including:
shifting of shifting the electronic timepiece between a normal operation state and a power saving state in which operation of the electronic timepiece is restricted, depending on a status of the electronic timepiece; and
timing setting of, in response to an elapsed time from a valid period of the predicted positional information exceeding a predetermined reference time during the power saving state, causing the communication unit to receive updated data of the predicted positional information and other information from the external device when shifting the electronic timepiece from the power saving state to the normal operation state.

According to a third aspect of the present disclosure, there is provided a non-transitory computer-readable storage medium storing a program to cause a computer of an electronic timepiece including a radio wave receiver receiving radio waves from positioning satellites and a communication unit communicating with an external device, the storage medium further storing predicted positional information on the positioning satellites, to perform;
shifting the electronic timepiece between a normal operation state and a power saving state in which operation of the electronic timepiece is restricted, depending on a status of the electronic timepiece; and
in response to an elapsed time from a valid period of the predicted positional information exceeding a predetermined reference time during the power saving state, causing the communication unit to receive updated data of the predicted positional information and other information from the external device when shifting the electronic timepiece from the power saving state to the normal operation state.

BRIEF DESCRIPTION OF THE SEVERAL VIEWS OF THE DRAWING

The accompanying drawings, which are incorporated in and constitute a part of the specification, illustrate embodiments, and together with the general description given above and the detailed description of the embodiments given below, serve to explain the principles of the present invention, wherein.

DETAILED DESCRIPTION OF THE INVENTION

Hereinafter, one or more embodiments of the present invention will be described with reference to the drawings.

Figure 1:
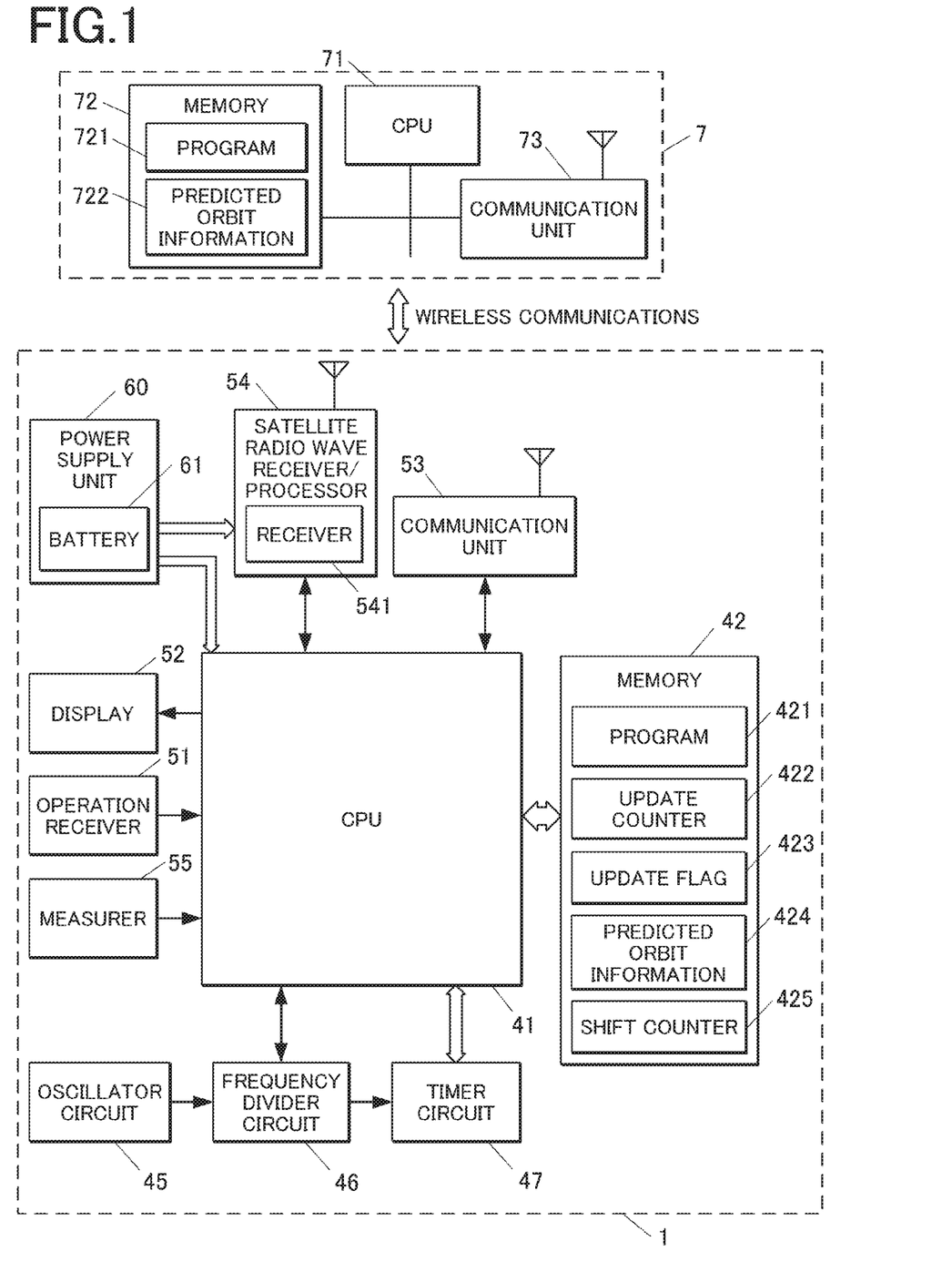
FIG. 1 is a block diagram showing functional configurations of an electronic timepiece and an external device according to an embodiment(s)

FIG. 1 is a block diagram showing functional configurations of an electronic timepiece 1 and an external device 7 according to an embodiment(s).

The electronic timepiece 1 includes a central processing unit (CPU) 41, a memory 42, an oscillator circuit 45, a frequency divider circuit 46, a timer circuit 47, an operation receiver 51, a display 52, a communication unit 53, a satellite radio wave receiver/processor 54, a measurer 55 and a power supply unit 60.

The CPU 41 is a processor that performs various mathematical operations and overall control of operation of each component of the electronic timepiece 1. The CPU 41 reads and executes a program 421 stored in the memory 42, thereby performing various types of control. The CPU 41 causes the satellite radio wave receiver/processor 54 to perform positioning and date-and-time obtaining. The CPU 41 performs elapsed time counting (stopwatch operation) on the basis of signals output from the frequency divider circuit 46. The CPU 41 switches between a power saving mode (power saving state) in which operation of the electronic timepiece 1 is restricted and a normal mode (normal operation state) on the basis of various physical quantities measured by the measurer 55 and input operations input to the operation receiver 51.

The memory 42 provides the CPU 41 with a memory space for work, and stores various data. The memory 42 includes, for example, a random access memory (RAM) and a nonvolatile memory. The RAM is used for the mathematical operations performed by the CPU 41 and stores temporary data. The nonvolatile memory is, for example, a flash memory, and stores various settings, the program 421 and so forth. The program 421 includes an information update control process described below.

The memory 42 also stores the value (counted value) of an update counter 422, an update flag 423, predicted orbit information 424 (predicted positional information), the value (counted value) of a shift counter 425 and so forth. The value of the update counter 422 is a value obtained by counting days elapsed from the last update of the predicted orbit information 424. The update flag 423 is a binary flag indicating whether or not the predicted orbit information 424 needs to be updated. In this embodiment, the value of the update flag 423 being "1" indicates that the predicted orbit information 424 needs to be updated. The predicted orbit information 424 is data of predicted orbits of positioning satellites obtained from outside through the communication unit 53. The positioning satellites are, for example, global positioning system (GPS) satellites, but may be positioning satellites of another positioning system(s) in addition to or instead of the GPS satellites.

The shift counter 425 stores the counted value that is used for determining whether or not to shift the electronic timepiece 1 to/from the normal mode from/to the power saving mode. Basic programs and data of initial settings of the electronic timepiece 1 may be stored in a read only memory (ROM) or the like and are not updated usually.

The oscillator circuit 45 generates and outputs a clock signal(s) of a predetermined oscillation frequency of, for example, 32.768 kHz to the frequency divider circuit 46. The frequency divider circuit 46 divides the clock signal input from the oscillator circuit 45, thereby converting the clock signal into a signal of a frequency that is necessary for each component of the electronic timepiece 1 to operate, and outputs the signal. The destination of the signal generated by the frequency divider circuit 46 includes the timer circuit 47.

The timer circuit 47 counts the signals of the frequency input from the frequency divider circuit 46 to calculate and hold the current date and time. The format of the current date and time held by the timer circuit 47 is not limited to the year, month, date, hour, minute and second format, and may be any format as long as it is suitable for processes performed by the CPU 41 and so forth. The oscillation frequency of the oscillator circuit 45 slightly changes according to the external environment, such as temperature. Under the normal environment, at the maximum, a deviation of about 0.5 seconds per day may occur in the date and time counted by the timer circuit 47. The CPU 41 may correct the deviation in the date and time counted by the timer circuit 47 on the basis of accurate current date-and-time information obtained from outside by the electronic timepiece 1 through, for example, the communication unit 53 and/or the satellite radio wave receiver/processor 54.

The operation receiver 51 receives input operations from outside, for example, from a user, and outputs input signals corresponding to the input operations to the CPU 41. The operation receiver 51 includes, for example, a push-button switch and/or a crown. The operation receiver 51 may include a touchscreen provided in such a way as to be superposed on a digital display screen of the display 52.

The display 52 performs display under the control of the CPU 41. The display 52 has, for example, the digital display screen, and performs digital display (presentation). The digital display screen is, for example, a liquid crystal screen or an organic electro-luminescent (EL) screen. Instead of or in addition to the digital display screen, the display 52 may have an analog display unit that displays information by hands pointing marks.

The communication unit 53 performs and controls data sending/receiving (data communications) to/from (with) external devices, such as the external device 7. In this embodiment, the communication unit 53 includes an antenna and a sending/receiving circuit, and performs short-range wireless communications, such as communications in accordance with Bluetooth®. The communication unit 53 can perform Low Energy communications in accordance with Bluetooth version 4 or later version (hereinafter "BLE communications"), and maintain a communication connection state unless (i) communication connection is disconnected in response to a disconnecting command (e.g. a command to shift to a mode in which transmission of radio waves is prohibited, a command to restrict operable functions due to shortage of charging capacity, etc.) or (ii) a link loss state occurs in which communications with the external device 7 as the destination of the communication connection is unavailable (e.g. a communication function of the external device 7 has been deactivated, distance to the external device 7 has become longer and consequently the communication unit 53 has not received radio waves from the external device 7 for a predetermined period of time corresponding to slave latency or longer, etc.) (i.e. while the communication unit 53 can transmit and receive radio waves).

The satellite radio wave receiver/processor 54 includes a receiver 541 (radio wave receiver) including an antenna and a receiving circuit for receiving radio waves from the positioning satellites, and processes the received radio waves in various manners, for example, decodes the received radio waves, thereby identifying the current position (positioning) and obtaining the current date-and-time information. Operation of the satellite radio wave receiver/processor 54, operation of the receiver 541 in particular, consumes a larger amount of power than, for example, date-and-time counting and its display in the electronic timepiece 1 or BLE communications of the communication unit 53. Power supply to the satellite radio wave receiver/processor 54 may be separately switchable between ON and OFF from power supply to the entire electronic timepiece 1, which includes the CPU 41. The satellite radio wave receiver/processor 54 may be able to directly read the predicted orbit information 424 from the memory 42, not via the CPU 41. The read predicted orbit information 424 may be stored and held in a memory of the satellite radio wave receiver/processor 54. In this case, the predicted orbit information 424 in the memory 42 may be delated after read therefrom.

The measurer 55 measures and outputs, to the CPU 41, the physical quantities relevant to the motion status and the usage status of the electronic timepiece 1. The measurer 55 includes, for example, an acceleration sensor that measures acceleration of the electronic timepiece 1, an inclination detector that detects inclination of the display screen, and an illuminance sensor that detects incident light on the display surface (a predetermined measurement point on the display screen). In the electronic timepiece 1 of this embodiment, the measured values by these sensors or binary signals indicating whether or not the measured values exceed their respective predetermined reference values may be output to the CPU 41.

The operation receiver 51 and the measurer 55 constitute a detector of the electronic timepiece 1 of this embodiment.

The power supply unit 60 includes a battery 61, and from the battery 61, supplies power with a predetermined voltage (may supply the power indirectly via the CPU 41 or the like) to each component of the electronic timepiece 1 to operate. The battery 61 includes, for example, a solar panel and a storage battery. Alternatively, as the battery 61, a detachable dry cell or button cell may be used. Still alternatively, the power supply unit 60 may have, as the battery 61, a secondary cell, such as a lithium-ion battery, which is charged by being connected to a power source through a cable or a connector terminal or by being electromagnetically coupled with a power source.

The external device 7 includes a CPU 71, a memory 72 and a communication unit 73.

The CPU 71 performs various mathematical operations and overall control of operation of the external device 7. The memory 72 stores temporary data for the mathematical operations performed by the CPU 71, and also stores a program 721, various data and so forth. The various data include predicted orbit information 722.

The communication unit 73 can perform short-range wireless communications (BLE communications) through which the communication unit 73 (external device 7) can communicate with the electronic timepiece 1, communications via the Internet (packet communications) using a wireless local area network (LAN) or the like, and telephone communications using a telephone line. The communication unit 73 can access an information providing server that provides predicted orbit information, which is described below, via the Internet.

The external device 7 is, for example, a smartphone, and may include components that smartphones usually have, such as a display, an operation receiver, a sound output unit, an informing unit that outputs beeps, vibrations and so forth, and a power supply unit.

Next, positioning will be described. In the electronic timepiece 1 of this embodiment, the satellite radio wave receiver/processor 54 performs a mathematical operation(s) for positioning on the basis of radio waves received from a plurality of positioning satellites, and outputs information on the current position to the CPU 41 one time, intermittently, or continuously. At the time, if the satellite radio wave receiver/processor 54 does not, from the positioning satellites, receive or hold the orbit information (ephemeris) that is valid (has a valid period), the satellite radio wave receiver/processor 54 obtains the current position of each positioning satellite using the predicted orbit information 424 (predicted ephemeris) and performs the mathematical operation for positioning.

The predicted orbit information has a valid period of, for example, about three to seven days, is updated about once a day, and is disclosed on a predetermined information providing server or the like. In this embodiment, for the sake of simplicity, it is assumed that the predicted orbit information that is valid from the start of a day is disclosed every day at the timing at which the date changes. However, this is not a limitation. The external device 7, which can access the information providing server, usually obtains the predicted orbit information every time the predicted orbit information is updated, namely every day. The electronic timepiece 1 obtains this predicted orbit information from the external device 7 through the communication unit 53. The external device 7 may use the predicted orbit information when the external device 7 itself performs positioning. When the external device 7 itself does not use the predicted orbit information, the external device 7 may not obtain the predicted orbit information on a day on which the predicted orbit information is not scheduled to be sent to the electronic timepiece 1 (e.g. the day after the predicted orbit information is sent to the electronic timepiece 1, which is described below).

The more distant the date is from the present time onward, the lower the accuracy of the predicted positions of the positioning satellites based on the predicted orbit information is. However, as described above, the predicted orbit information is frequently updated. Consequently, the valid period of the predicted orbit information is often sufficiently longer than the update interval thereof. Hence, in the electronic timepiece 1, the receiving frequency of the predicted orbit information can be set to be lower than the update frequency thereof. For example, when the valid period of the predicted orbit information is three days, and the electronic timepiece 1 has a receiving frequency of once every two days or less, the electronic timepiece 1 obtains updated predicted orbit information when the elapsed time from the start of the valid period of the current predicted orbit information becomes at least twice the update interval of the predicted orbit information disclosed on the information providing server, and the remaining time of the valid period becomes one day or less.

Figure 2:
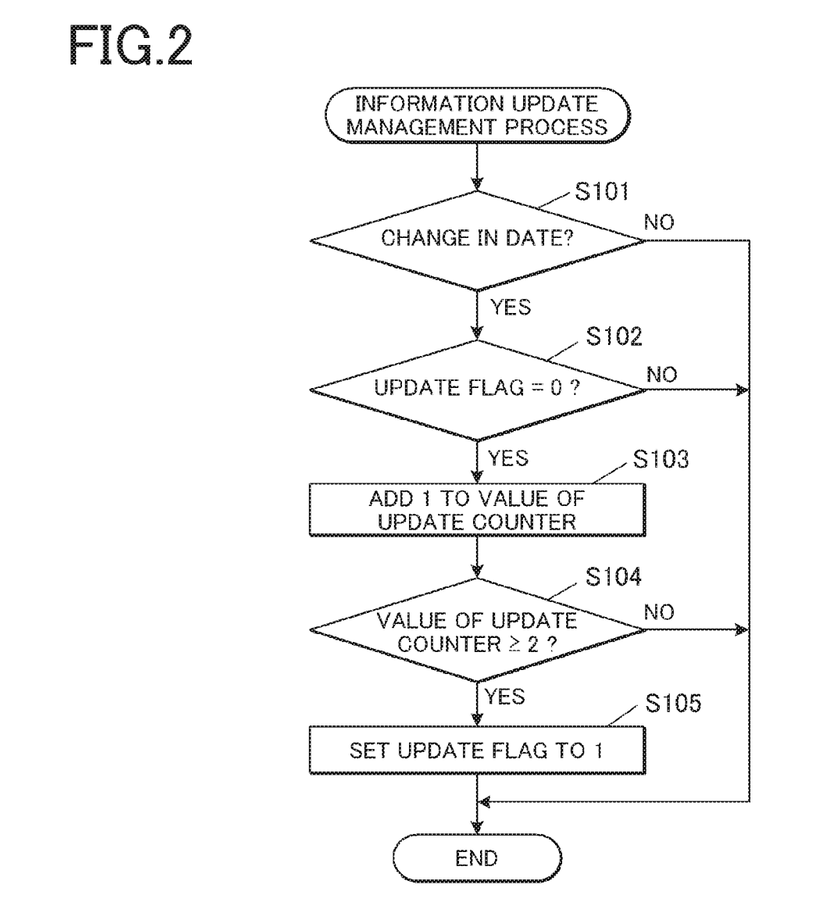
FIG. 2 is a flowchart showing a control procedure in an information update management process.

FIG. 2 is a flowchart showing a control procedure for the CPU 41 in an information update management process that is performed in the electronic timepiece 1. This information update management process is a process for determining whether or not update of the predicted orbit information 424 is needed. The information update management process is started regularly, for example, every minute or every hour, in tune with operation of the timer circuit 47, for example.

When the information update management process is started, the CPU 41 determines whether or not it is the timing at which the date changes, namely whether or not it is 0:00 (Step S101). If the CPU 41 determines that it is not the timing at which the date changes (Step S101; NO), the CPU 41 ends the information update management process.

If the CPU 41 determines that it is the timing at which the date changes (Step S101; YES), the CPU 41 determines whether or not the update flag 423 is "0" (update-unneeded setting) (Step S102). If the CPU 41 determines that the update flag 423 is not "0" (Step S102; NO), the CPU 41 ends the information update management process.

If the CPU 41 determines that the update flag 423 is "0" (Step S102; YES), the CPU 41 adds "1" to the value of the update counter 422 (Step S103). The order of Step S102 and Step S103 may be reversed. The maximum value of the update counter 422 may be a value that agrees with the number of valid days of the predicted orbit information. For example, the maximum value of the update counter 422 is "6" when the number of valid days is "7".

The CPU 41 determines whether or not the value of the update counter 422 is equal to or greater than "2" (Step S104). If the CPU 41 determines that the value of the update counter 422 is not equal to or greater than "2", namely it is not two or more days after the last update of the predicted orbit information 424 (Step S104; NO), the CPU 41 ends the information update management process. If the CPU 41 determines that the value of the update counter 422 is equal to or greater than "2", namely two or more days has elapsed from the start of the valid period of the predicted orbit information 424 updated last time and stored, and the remaining time of the valid period is one day or less (the elapsed time exceeds a predetermined reference time) (Step S104; YES), the CPU 41 sets the update flag 423 to "1" (update-needed setting) (Step S105). The CPU 41 then ends the information update management process.

In this embodiment, the value of the update counter 422 is changed at the timing at which the date changes. However, if the external device 7 has a preset timing on each day at which the external device 7 obtains the predicted orbit information, the value of the update counter 422 may be changed at a predetermined time that is the same as or after the preset timing.

When the update flag 423 is set to "1", the electronic timepiece 1 of this embodiment obtains (receives) new/updated predicted orbit information (updated data) (and the current date-and-time information) when obtaining the current date-and-time information from the external device 7 by BLE communications of the communication unit 53. The current date-and-time information is usually obtained at least once a day. For example, when the electronic timepiece 1 and the external device 7 are reconnected after their communication connection by BLE communications is disconnected, the electronic timepiece 1 obtains, if necessary, the current date-and-time information depending on the type of the reconnection under a predetermined condition. For example, when the electronic timepiece 1 and the external device 7 are disconnected and reconnected manually with input operations that are input to the operation receiver 51, or when the electronic timepiece 1 and the external device 7 are disconnected for the electronic timepiece 1 shifting to the power saving mode and reconnected for the electronic timepiece 1 returning to the normal mode, the electronic timepiece 1 always obtains the current date-and-time information. On the other hand, when the electronic timepiece 1 and the external device 7 are reconnected after link loss, the electronic timepiece 1 obtains the current date-and-time information only when the date is different from the date of the last obtainment of the current date-and-time information. In BLE communications, link loss frequently occurs every day (usually for a short period of time). Hence, a situation is not usually assumed where no disconnected communications or link loss occurs even once a day.

Next, the power saving mode will be described in more detail. The power saving mode is a mode in which when it is determined that the user has not used the electronic timepiece 1, not date-and-time counting and its minimum display (e.g. hours and minutes) but operation, in particular, that consumes a large amount of power is stopped to reduce power consumption. Whether or not to shift the electronic timepiece 1 to the power saving mode is determined based on whether or not a first condition for an unused state of the electronic timepiece 1 is satisfied. Examples of the first condition are as follows: (i) it is the nighttime in the local time, for example, between 22:00 and 6:00 (the current time belongs to a specific time range); (ii) no input operation to the operation receiver 51 has been detected for a while; and (iii) the display screen of the display 52 is still because the user has not looked at the display screen according to the measurement result by the measurer 55. As to each of the examples (ii) and (iii), whether or not the first condition is satisfied is determined based on the detection result by the detector. In the power saving mode, operation of the communication unit 53 and operation of the satellite radio wave receiver/processor 54 are stopped, and display (presentation) or the update frequency of display of the display 52 is restricted or reduced. For example, display on the digital display screen may be partly deleted, or a value indicating seconds may not be displayed or updated. When the display 52 has the analog display unit having hands, operation of the second hand is stopped, for example. When the display 52 has both the digital display screen and the analog display unit, digital display may be turned off completely.

Figure 3:
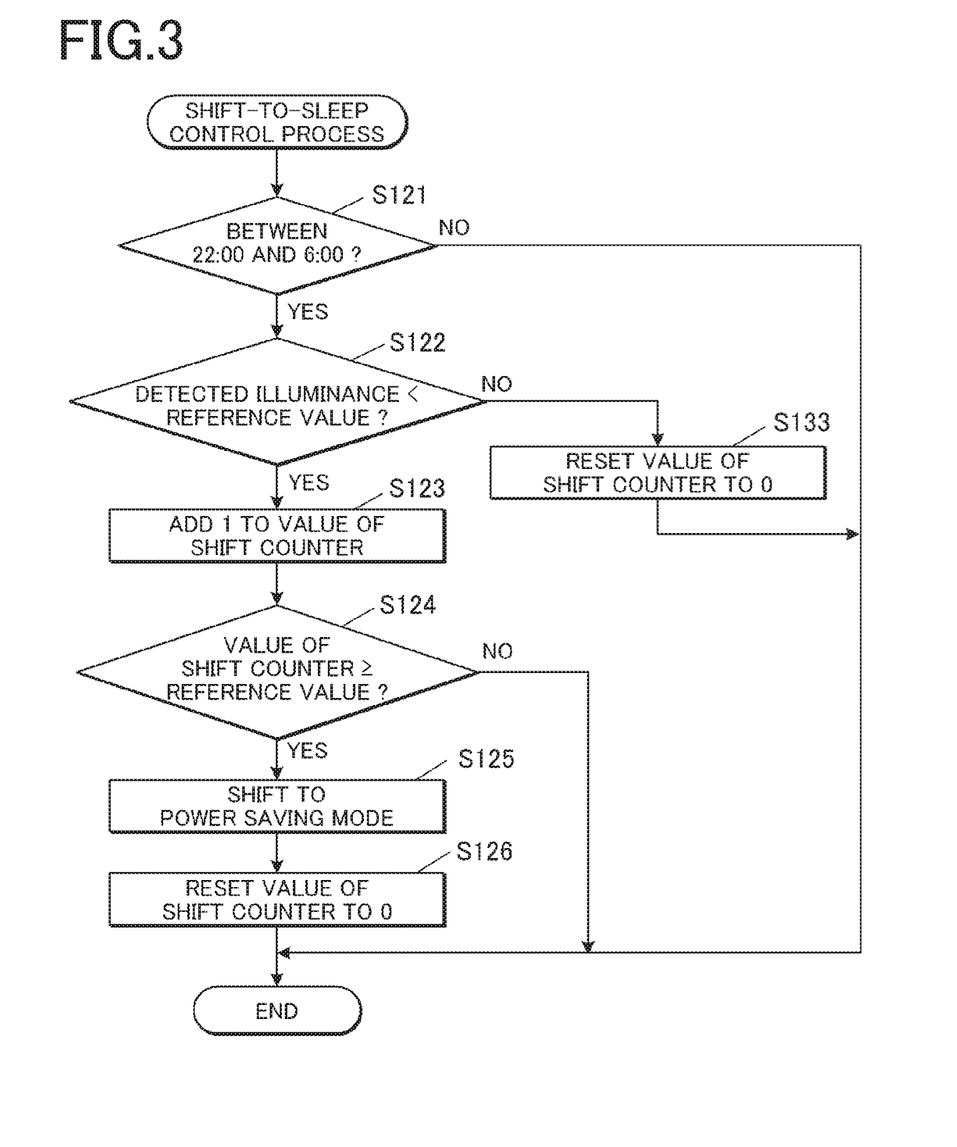
FIG. 3 is a flowchart showing a control procedure in a shift-to-sleep control process.

FIG. 3 is a flowchart showing a control procedure for the CPU 41 in a shift-to-sleep control process for shifting the electronic timepiece 1 to the power saving mode (sleep mode). This shift-to-sleep control process is called and started in the normal mode regularly, for example, every minute.

When the shift-to-sleep control process is started, the CPU 41 determines whether or not it is between 22:00 and 6:00 (Step S121). If the CPU 41 determines that it is not between 22:00 and 6:00 (Step S121; NO), the CPU 41 ends the shift-to-sleep control process.

If the CPU 41 determines that it is between 22:00 and 6:00 (Step S121; YES), the CPU 41 determines whether or not the illuminance of incident light detected by the measurer 55 is smaller than a predetermined reference value (Step S122). The illuminance about which the determination is made may be the maximum value since the last shift-to-sleep control process. If the CPU 41 determines that the illuminance is not smaller than the reference value (Step S122; NO), the CPU 41 resets the value of the shift counter 425 to "0" (Step S133). The CPU 41 then ends the shift-to-sleep control process.

If the CPU 41 determines that the illuminance is smaller than the reference value (Step S122; YES), the CPU 41 adds "1" to the value of the shift counter 425 (Step S123). The CPU 41 determines whether or not the value of the shift counter 425 is equal to or greater than a predetermined reference value (positive integer) (Step S124). If the CPU 41 determines that the value of the shift counter 425 is not equal to or greater than the reference value (Step S124; NO), the CPU 41 ends the shift-to-sleep control process.

If the CPU 41 determines that the value of the shift counter 425 is equal to or greater than the reference value (Step S124; YES), the CPU 41 performs a process of shifting the electronic timepiece 1 to the power saving mode (Step S125). In the process of shifting the electronic timepiece 1 to the power saving mode, operation of the communication unit 53 is stopped. Hence, the CPU 41 may disconnect the communication connection maintained by the communication unit 53, before stopping operation of the communication unit 53. The CPU 41 resets the value of the shift counter 425 to "0" (Step S126). The CPU 41 then ends the shift-to-sleep control process.

Figure 4:
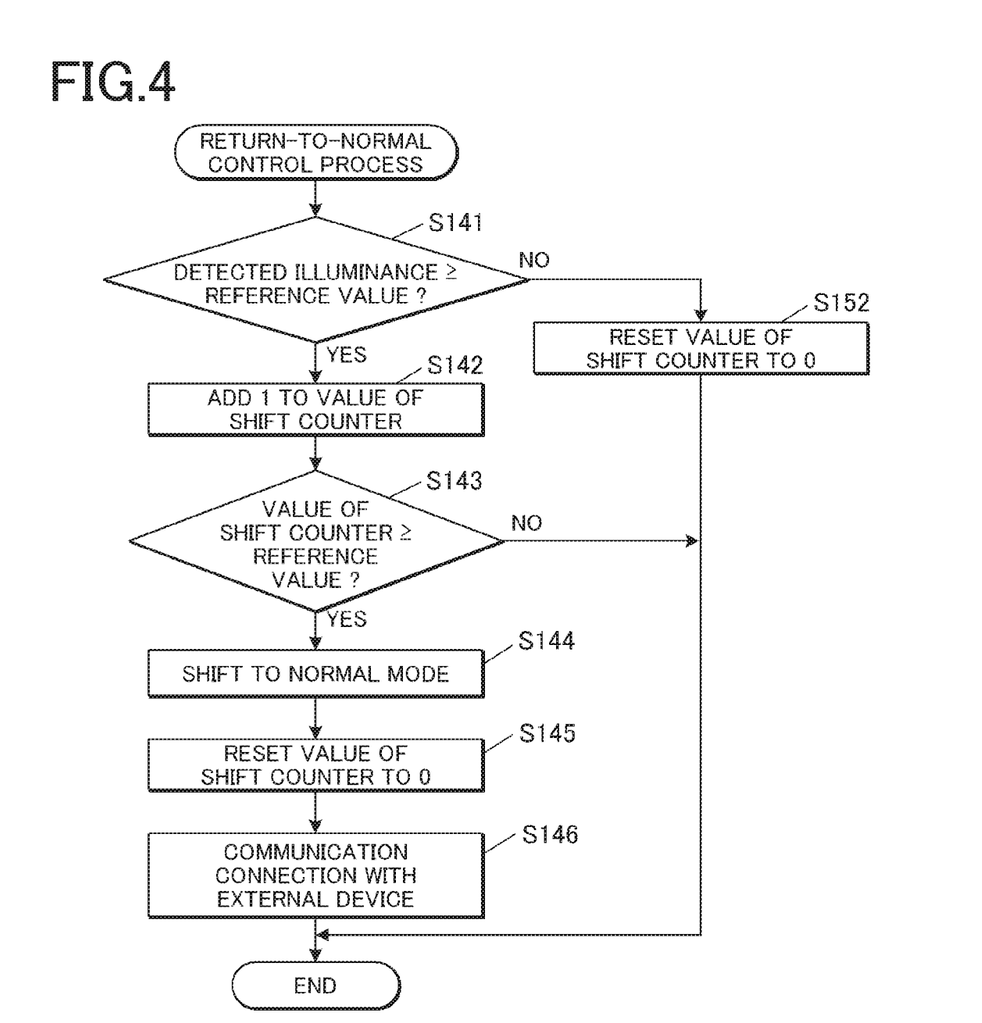
FIG. 4 is a flowchart showing a control procedure in a return-to-normal control process.

Whether or not to return the electronic timepiece 1 to the normal mode is determined based on whether or not a second condition for an in-use state of the electronic timepiece 1 is satisfied. Examples of the second condition are as follows: an input operation has been received by the operation receiver 51; and the measurement result by the measurer 55 indicates that the user is using the electronic timepiece 1. Whether or not the second condition is satisfied is determined based on the detection result by the detector. In this embodiment, whether or not to return the electronic timepiece 1 to the normal mode is determined based on whether or not a usable state (Step S141; YES, which is described below) of the electronic timepiece 1 is maintained (S143; YES, which is described below) and the unused state of the electronic timepiece 1 has been canceled.

FIG. 4 is a flowchart showing a control procedure for the CPU 41 in a return-to-normal control process for returning the electronic timepiece 1 to the normal mode. This return-to-normal control process is called and started in the power saving mode, for example, every minute, to determine whether or not the usable state is maintained.

When the return-to-normal control process is started, the CPU 41 determines whether or not the illuminance detected by the measurer 55 is equal to or greater than a predetermined reference value (Step S141). The illuminance may be the maximum value since the last return-to-normal control process. The reference value may be a value different from the reference value in the shift-to-sleep control process, for example, a slightly greater value. If the CPU 41 determines that the illuminance is not equal to or greater than the reference value (Step S141; NO), the CPU 41 resets the value of the shift counter 425 to "0" (Step S152). The CPU 41 then ends the return-to-normal control process.

If the CPU 41 determines that the illuminance is equal to or greater than the reference value (Step S141; YES), the CPU 41 adds "1" to the value of the shift counter 425 (Step S142). The CPU 41 determines whether or not the value of the shift counter 425 is equal to or greater than a predetermined reference value (positive integer) (Step S143). The reference value may be the same as the reference value in the shift-to-sleep control process, or may be different from the reference value in the shift-to-sleep control process, for example, a slightly smaller value. If the CPU 41 determines that the value of the shift counter 425 is not equal to or greater than the reference value (Step S143; NO), the CPU 41 ends the return-to-normal control process.

If the CPU 41 determines that the value of the shift counter 425 is equal to or greater than the reference value (Step S143; YES), the CPU 41 performs a process of shifting the electronic timepiece 1 to the normal mode (Step S144). The CPU 41 restarts each restricted operation described above. The CPU 41 may not need to restart operation of the satellite radio wave receiver/processor 54 immediately unless a command to operate the satellite radio wave receiver/processor 54 is input. The CPU 41 resets the value of the shift counter 425 to "0" (Step S145).

The CPU 41 causes the communication unit 53 restarted in Step S144 to establish communication connection with the external device 7 by BLE communications (Step S146). The CPU 41 then ends the return-to-normal control process.

Figure 5:
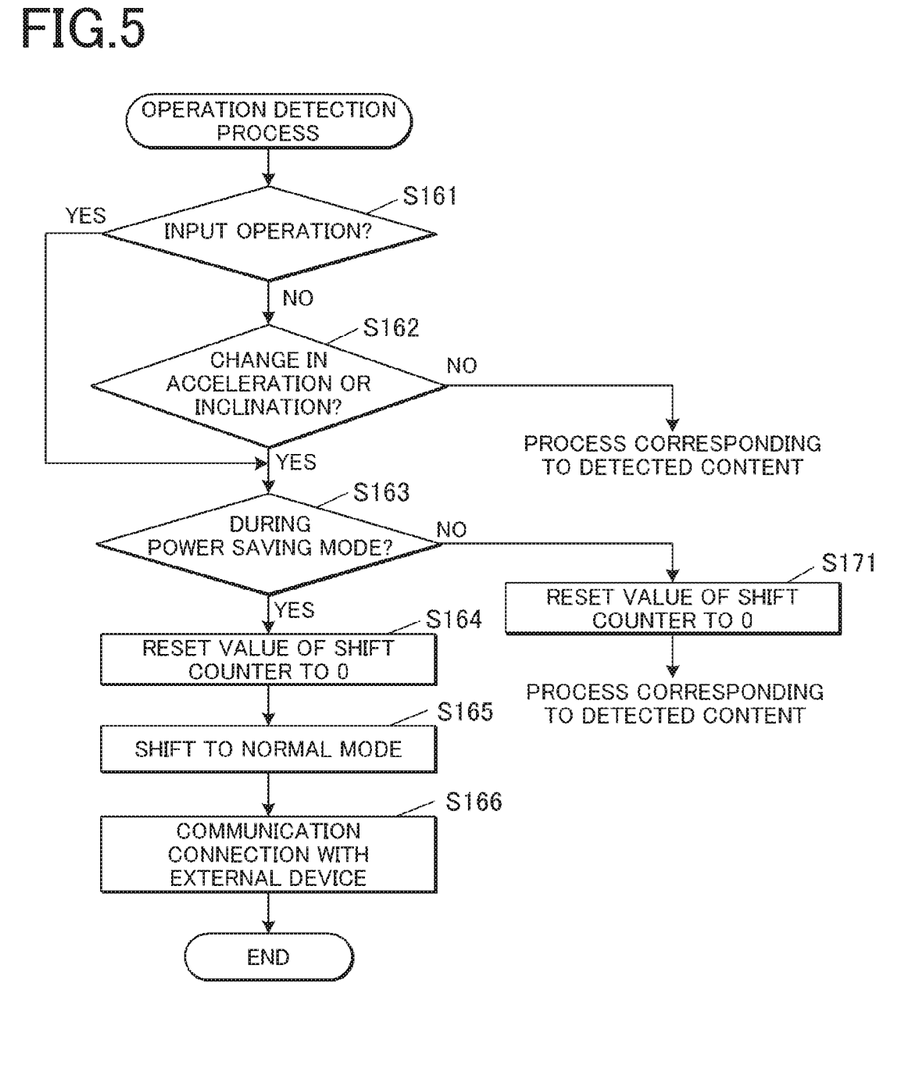
FIG. 5 is a flowchart showing a control procedure in an operation detection control process.

FIG. 5 is a flowchart showing a control procedure for the CPU 41 in an operation detection control process for detecting operation of the electronic timepiece 1 during the power saving mode (i.e. while the power saving mode is active) or between 22:00 and 6:00 during which the electronic timepiece 1 may be shifted to the power saving mode. This operation detection control process is started when operation of the electronic timepiece 1 is detected during the power saving mode or between 22:00 and 6:00, and includes determining whether or not the unused state has been cancelled.

When the operation detection control process is started, the CPU 41 determines whether or not an input operation to the operation receiver 51 has been detected (Step S161). If the CPU 41 determines that an input operation has been detected (Step S161; YES), the CPU 41 proceeds to Step S163.

If the CPU 41 determines that no input operation has been detected (Step S161; NO), the CPU 41 determines whether or not either change in the acceleration or change in the angle of the inclination equal to or greater than a reference degree has been detected by the measurer 55 (Step S162). If the CPU 41 determines that neither of these has been detected (another type of operation has been detected) (Step S162; NO), the CPU 41 proceeds to a process corresponding to the detected content if necessary. If the CPU 41 determines that change in the acceleration or change in the angle of the inclination equal to or greater than the reference degree has been detected (Step S162; YES), the CPU 41 proceeds to Step S163.

In Step S163 after Step S161 and/or Step S162, the CPU 41 determines whether or not the power saving mode is active (Step S163). If the CPU 41 determines that the power saving mode is not active (Step S163; NO), the CPU 41 resets the value of the shift counter 425 to "0" (Step S171), and proceeds to a process corresponding to the detected content (e.g. input operation) if necessary.

If the CPU 41 determines that the power saving mode is active (Step S163; YES), the CPU 41 resets the value of the shift counter 425 to "0" (Step S164). The CPU 41 performs a process of shifting the electronic timepiece 1 to the normal mode (Step S165). The CPU causes the communication unit 53 restarted in Step S165 to establish communication connection with the external device 7 (Step S166). The CPU 41 then ends the operation detection control process.

When returning the electronic timepiece 1 to the normal mode from the power saving mode due to detection of an input operation, the CPU 41 may or may not perform part or all of a process corresponding to the detected content. When part of the process is performed, for example, a light may be turned on, and/or informing, such as alarm outputting, may be stopped.

Each of the processes shown in FIG. 3 to FIG. 5 includes shifting included in an information update control method of the electronic timepiece 1 of this embodiment.

Figure 6:
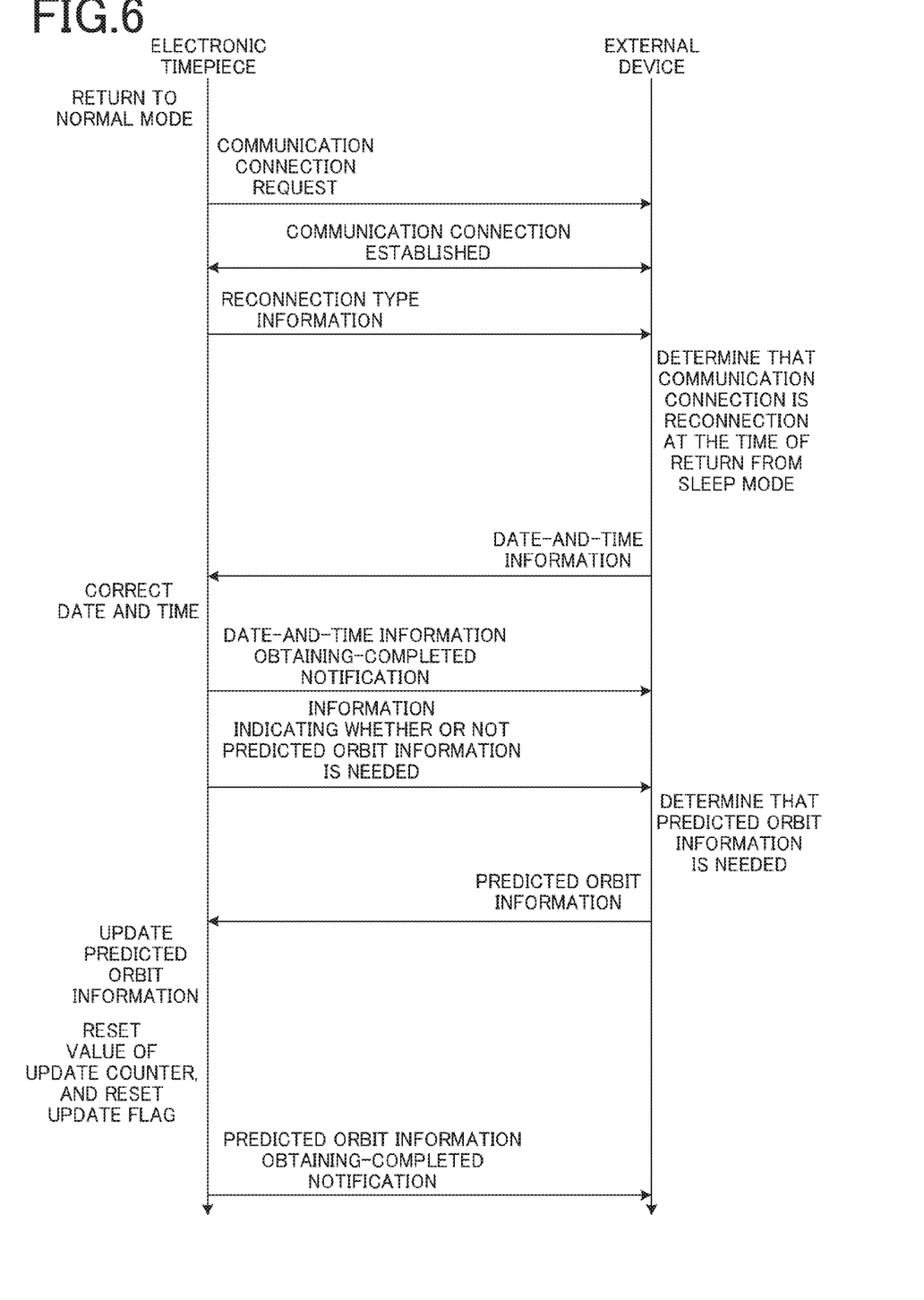
FIG. 6 is a sequence diagram showing what the electronic timepiece and the external device communicate and do when they establish communication connection.

FIG. 6 is a sequence diagram showing what the electronic timepiece 1 and the external device 7 communicate and do when they establish communication connection at the time of the electronic timepiece 1 returning to the normal mode from the power saving mode.

When returning to the normal mode, the electronic timepiece 1 sends a communication connection request to the external device 7, so that communication connection is established between the electronic timepiece 1 and the external device 7. The CPU 41 sends reconnection type information on the type of the reconnection (by extension, indicating whether or not the current date-and-time information is needed) to the external device 7. When determining that the current date-and-time information is needed, the external device 7 sends the current date-and-time information to the electronic timepiece 1.

The electronic timepiece 1 corrects the date and time counted by the timer circuit 47 on the basis of the received current date-and-time information, and sends a date-and-time information obtaining-completed notification to the external device 7. Subsequently, the electronic timepiece 1 sends the information indicating whether or not the predicted orbit information is needed, for example, the update flag 423, to the external device 7.

When determining that the predicted orbit information is needed on the basis of the information indicating whether or not the predicted orbit information is needed, the external device 7 reads and sends the latest predicted orbit information 722 to the electronic timepiece 1. When receiving the whole data of the predicted orbit information 722 sent from the external device 7, the electronic timepiece 1 updates the predicted orbit information 424 with the received data, resets the value of the update counter 422, and resets the update flag 423. The electronic timepiece 1 then sends a predicted orbit information obtaining-completed notification to the external device 7.

As described above, when the electronic timepiece 1 is returned to the normal mode, and accordingly the communication unit 53 is restarted, the electronic timepiece 1 obtains the current date-and-time information, and subsequently obtains the predicted orbit information if the update flag 423 is "1".

Figure 7:
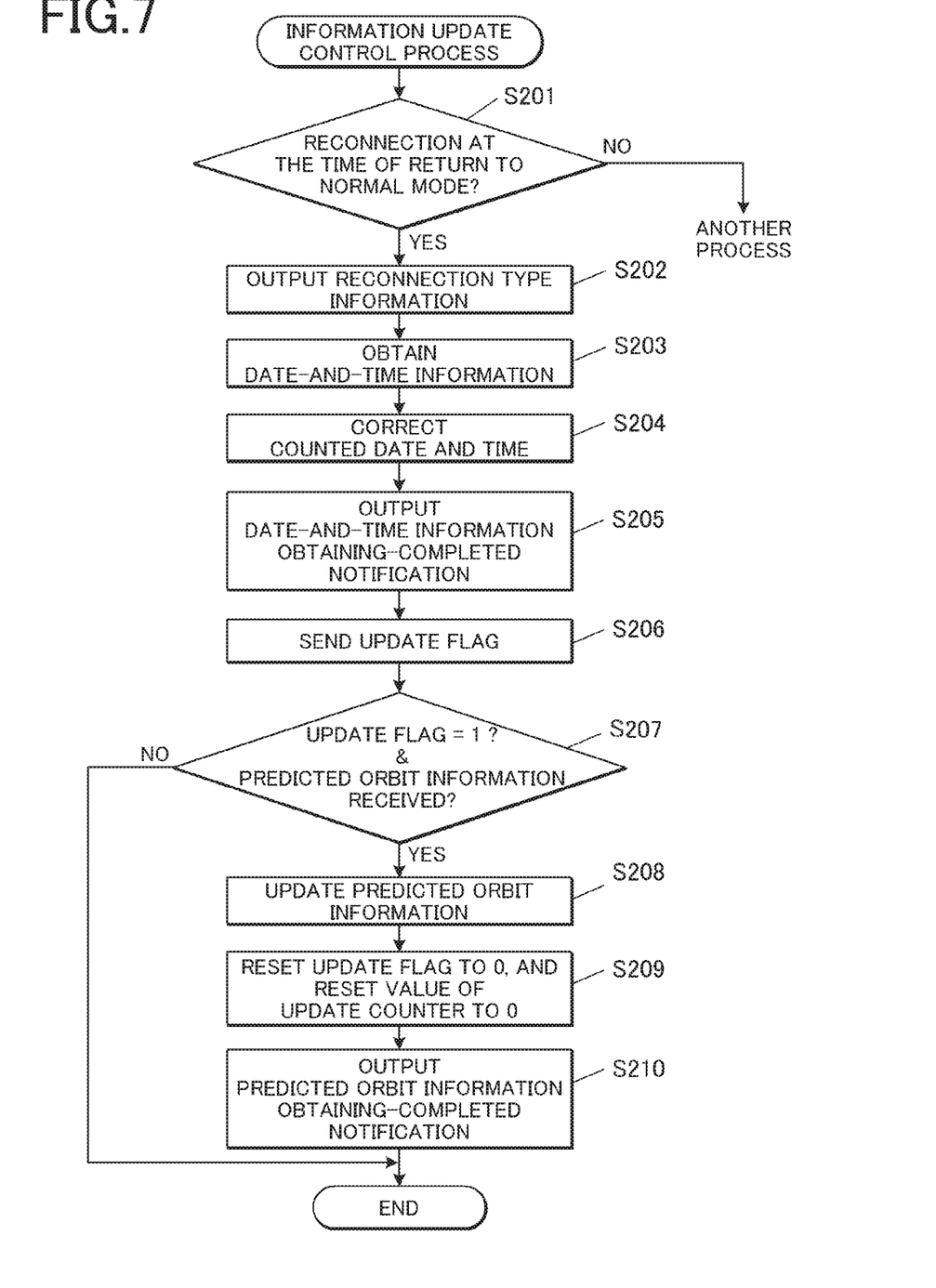
FIG. 7 is a flowchart showing a control procedure in an information update control process.

FIG. 7 is a flowchart showing a control procedure for the CPU 41 in an information update control process that is performed in the electronic timepiece 1. This information update control process is started when the electronic timepiece 1 and the external device 7 are reconnected.

When the information update control process is started, the CPU 41 determines whether or not the reconnection is reconnection at the time of return to the normal mode from the power saving mode (Step S201). If the CPU 41 determines that the reconnection is not reconnection at the time of return to the normal mode from the power saving mode (Step S201; NO), the CPU 41 proceeds to another process.

If the CPU 41 determines that the reconnection is reconnection at the time of return to the normal mode from the power saving mode (Step S201; YES), the CPU 41 outputs the information indicating that the reconnection is "reconnection at the time of return to the normal mode" as the type of the reconnection to the external device 7 through the communication unit 53 (Step S202). Alternatively, the CPU 41 may simply output a signal requesting the current date-and-time information.

The CPU 41 obtains the current date-and-time information received from the external device 7 through the communication unit 53 (Step S203). The CPU 41 corrects the current date and time counted by the timer circuit 47 with the obtained current data-and-time information (Step S204). The CPU 41 outputs a date-and-time information obtaining-completed notification to the external device 7 through the communication unit 53 (Step S205).

The CPU 41, which has received (obtained) the current date-and-time information, subsequently sends the information indicating whether or not the predicted orbit information is needed, for example, the update flag 423, to the external device 7 through the communication unit 53 (Step S206; timing setting). The CPU 41 determines whether or not the value of the update flag 423 is "1" and whether or not the communication unit 53 has received the predicted orbit information from the external device 7 (Step S207). If the CPU 41 determines that the value of the update flag 423 is not "1" (update unneeded) or the communication unit 53 has not received the predicted orbit information (e.g. the external device 7 (smartphone) has not obtained updated predicted orbit information) (Step S207; NO), the CPU 41 ends the information update control process.

If the CPU 41 determines that the value of the update flag 423 is "1" (the predetermined condition is satisfied) and the communication unit 53 has received the predicted orbit information (Step S207; YES), the CPU 41 updates the predicted orbit information 424 with the received predicted orbit information (Step S208). The CPU 41 resets the value of the update counter 422 to "0", and resets the update flag 423 to "0" (Step S209). The CPU 41 outputs a predicted orbit information obtaining-completed notification to the external device 7 through the communication unit 53 (Step S210). The CPU 41 then ends the information update control process.

The processes in the respective steps of the information update control process may be performed without taking a standby time except for the time necessary for data reading/writing, data sending/receiving and so forth. That is, a series of processes of sending/receiving, from the current date-and-time information obtaining (receiving) to the predicted orbit information obtaining (receiving), may be continuously performed without having a standby state for more than the abovementioned necessary time in between.

As described above, the electronic timepiece 1 of this embodiment includes: the receiver 54 that receives radio waves from positioning satellites; the communication unit 53 that communicates with the external device 7; the memory 42 that stores the predicted orbit information 424 (predicted ephemeris) on the positioning satellites; and the CPU 41. The CPU 41 shifts the electronic timepiece 1 between the normal mode and the power saving mode in which operation of the electronic timepiece 1 is restricted, depending on the status of the electronic timepiece 1, and in response to the elapsed time from start of the valid period (e.g. three days) of the predicted orbit information 424 exceeding a predetermined reference time (e.g. two days) during the power saving mode, causes the communication unit 53 to receive updated data of the predicted orbit information and the current date-and-time information as other information from the external device 7 when shifting the electronic timepiece 1 from the power saving mode to the normal mode. Thus, during the power saving mode, the predicted orbit information, which is used by the satellite radio wave receiver/processor 54, the operation of which tends to be restricted during the power saving mode, is not obtained by using the communication unit 53, the operation of which also tends to be restricted during the power saving mode. The predicted orbit information and the current date-and-time information can be efficiently obtained when the communication unit 53 is in operation, without the communication unit 53 being caused to operate to obtain the predicted orbit information only. Further, because the predicted orbit information is obtained by accompanying the current date-and-time information, it is unnecessary to start and perform a process for obtaining the predicted orbit information and a process for obtaining the current date-and-time information separately, which improves efficiency. That is, while a conventional electronic timepiece, which merely obtains predicted orbit information regularly, sometimes decreases efficiency due to the limited capacity of battery, the electronic timepiece 1 can more efficiently perform processes for positioning.

In particular, by obtaining the predicted orbit information and the current date-and-time information and correcting the date and time counted by the timer circuit 47 with the obtained current date-and-time information, the electronic timepiece 1 can avoid a situation where although the electronic timepiece 1 has obtained the predicted orbit information, accuracy of the positioning result obtained first time is low because the date and time is incorrect, and also avoid a situation where the position (positioning result) cannot be obtained because the mathematical operation for positioning does not converge. Thus, the electronic timepiece 1 can efficiently and promptly identify the current position with a high degree of accuracy.

Further, the CPU 41 causes the communication unit 53 to receive the updated data of the predicted orbit information after the current date-and-time information. Because, as the electronic timepiece 1, the current date-and-time information has priority over the predicted orbit information, the electronic timepiece 1 obtains first the current date-and-time information and thereafter obtains the predicted orbit information.

Further, the electronic timepiece 1 includes the detector (measurer 55 and operation receiver 51) that performs detection relevant to the usage status of the electronic timepiece 1. On the basis of the result of the detection by the detector, (i) in response to determining that the first condition for the unused state being satisfied in the normal mode, the CPU 41 shifts the electronic timepiece 1 to the power saving mode, and (ii) in response to determining that the second condition for the in-use state being satisfied in the power saving mode, the CPU 41 shifts the electronic timepiece 1 to the normal mode.

Thus, the electronic timepiece 1 is shifted to the power saving mode depending on the usage status of itself, and hence can avoid a situation where the electronic timepiece 1 is shifted to the power saving mode while being used and does not perform necessary processes.

Further, the first condition includes the current time belonging to a specific time range in a day. Thus, the electronic timepiece 1 is not shifted to the power saving mode in the daytime, and hence the electronic timepiece 1 in a bag, under a sleeve or the like can be prevented from frequently shifting between the power saving mode and the normal mode and repeating processes performed at the time of shifting therebetween.

Further, the detector includes the operation receiver 51 that receives an input operation(s) from outside, and the second condition includes the operation receiver 51 receiving the input operation. That is, at the time of return to the normal mode, the electronic timepiece 1 needs to be in the usable state promptly for the user. Hence, when an input operation is received, the electronic timepiece 1 is promptly shifted to the normal mode without waiting until the usable state is maintained for a predetermined period of time. This can secure user friendliness. Then, after restart of the communication unit 53, the predicted orbit information and the current date-and-time information are obtained. This can improve processing efficiency.

Further, the communication unit 53 performs short-range wireless communications (BLE communications in the embodiment); in the normal mode, maintains communication connection while radio waves are transmittable and receivable between the electronic timepiece 1 and the external device 7; and disconnects the communication connection during the power saving mode. Even BLE communications, which consumes a small amount of power and usually allows always-on connection, consumes power anyway. Hence, in the power saving mode, the communication connection is completely disconnected to reduce power consumption, and even when new/updated predicted orbit information becomes available, obtainment of the predicted orbit information is postponed until after the electronic timepiece 1 is returned to the normal mode. This can suppress power consumption.

Further, the remaining time of the valid period of the predicted orbit information 424 at the timing at which the elapsed time from the start of the valid period exceeds the reference time is one day or less. Thus, on the last day of the valid period of the predicted orbit information 424, the updated data is obtained. This can reduce the frequency of predicted orbit information obtaining, and improve processing efficiency while certainly holding the predicted orbit information 424.

Further, the information update control method of the electronic timepiece 1 of this embodiment includes: shifting the electronic timepiece 1 between the normal mode and the power saving mode in which operation of the electronic timepiece 1 is restricted, depending on the status of the electronic timepiece 1; and in response to the elapsed time from start of the valid period of the predicted orbit information 424 exceeding a predetermined reference time during the power saving mode, causing the communication unit 53 to receive updated data of the predicted orbit information and other information from the external device 7 when shifting the electronic timepiece 1 from the power saving mode to the normal mode. Thus, the information update control method controls the timing at which the updated data of the predicted orbit information is obtained. This can more effectively perform processes for positioning, such as predicted ephemeris updating and positioning.

Further, by installing and executing, by software, the program 421 that causes a computer of the electronic timepiece 1 to perform the shifting and the timing setting included in the above-described processes, the electronic timepiece 1 can easily and appropriately control processing timings and more efficiently perform processes for positioning without using special hardware.

The present invention is not limited to the above embodiment, and can be variously modified.

For example, in the above embodiment, the shift counter 425 is used at the time of (i) shifting the electronic timepiece 1 to the power saving mode and at the time of (ii) returning the electronic timepiece 1 to the normal mode. Alternatively, separate counters may be provided. In this case, at the time of either (i) or (ii), a memory region reserved for the value of a counter that is not used at the time may be temporarily opened.

Further, in the above embodiment, the elapsed time from the start of the valid period of the predicted orbit information is counted in units of days, but may be counted in units of hours. Still further, when the start of the valid period of the predicted orbit information is not 0:00, the timing at which "1" is added to the value of the update counter 422 may be changed from the timing at which the date changes to the start time of the valid period of the predicted orbit information. Yet further, when the predicted orbit information is not obtained on the first day of the valid period, the value of the update counter 422 may be adjusted such that the initial value is not "0".

Further, in the above embodiment, the predicted orbit information and the current date-and-time information are obtained. However, the predicted orbit information and information different from the current date-and-time information may be obtained. At the time of return to the normal mode, the electronic timepiece 1 usually receives/obtains the current date-and-time information when reconnected with the external device 7. However, even when the electronic timepiece 1 does not receive the current date-and-time information, the electronic timepiece 1 may obtain the predicted orbit information and (subsequent to) not the current date-and-time information but other control information relevant to the establishment of communication connection or obtained after the establishment of communication connection. In this case too, it is unnecessary to start and perform the process (communication process) for obtaining the predicted orbit information and the process (communication process) for obtaining other information separately.

Further, the operation detection control process shown in FIG. 5 may be incorporated in the shift-to-sleep control process and/or the return-to-normal control process in a suitable manner for the modes.

Further, in the above embodiment, the electronic timepiece 1 may be shifted to the power saving mode between 22:00 and 6:00 only. However, the electronic timepiece 1 may be shifted to and stay in the power saving mode between 6:00 and 22:00 too in the same manner as it is shifted thereto between 22:00 and 6:00, or when it is determined with a higher degree of certainty that the user has not used the electronic timepiece 1 for a long period of time. The electronic timepiece 1 may be returned to the normal mode multiple times on the same day, and hence may be controlled to obtain the predicted orbit information at the time of the first return only.

While the electronic timepiece 1 may be shifted to the power saving mode between 22:00 and 6:00, a process may be added by which the electronic timepiece 1 is compulsorily returned to the normal mode at 6:00 and stays in the normal mode between 6:00 and 22:00. In addition, setting may be performed to extend the connection interval with the communication connection being maintained. In this case, the connection interval may be shortened when an input operation, change in the acceleration, change in the inclination or the like is detected in the operation detection control process shown in FIG. 5, and by taking this timing as the time of return to the normal mode completely, the current date-and-time information and the predicted orbit information may be obtained.

Further, in the above embodiment, operation of the communication unit 53 is stopped in the power saving mode, but may not be stopped, and only the communication connection with the external device 7 may be disconnected.

Further, in the above embodiment, as the power saving mode, the sleep mode is cited in which at the time of no use of a device in the nighttime, operation is restricted to suppress power consumption. In addition to or instead of the sleep mode, the power saving mode may be a save mode in which when power supply capability decreases due to, for example, power shortage of a battery, operation is restricted to suppress power consumption.

Further, in the above embodiment, as a non-transitory computer-readable storage medium storing the program 421 for control to obtain the positional information, the memory 42 having a nonvolatile memory, such as a flash memory, and/or a mask ROM is cited. However, the non-transitory computer-readable storage medium is not limited thereto. The non-transitory computer-readable storage medium may be a hard disk drive (HDD) or a portable storage medium, such as a CD-ROM or a DVD. Further, as a medium to provide, via a communication line, data of the program(s) of the present invention, a carrier wave may be used.

Besides, the specific details described in the above embodiment, such as configurations, components, settings, control details and control procedures, can be appropriately modified without departing from the scope of the present invention.

In the above, although one or more embodiments have been described, the scope of the present invention is not limited to the embodiments, and includes the scope of claims below and the scope of their equivalents.

What is claimed is:

1. An electronic timepiece comprising:
    a radio wave receiver configured to receive radio waves from positioning satellites;
    a communication unit configured to communicate with an external device;
    a memory configured to store predicted positional information on the positioning satellites; and
    a processor configured to:
        receive a signal on a status of one or more measured physical quantities relevant to one or more of a motion and a usage of the electronic timepiece;
        shift the electronic timepiece between a normal operation state in which communication with the communication unit is performed and a power saving state in which the communication with the communication unit is not performed, depending on the status of the one or more measured physical quantities; and
    in response to an elapsed time from a valid period of the predicted positional information exceeding a predetermined reference time during the power saving state,
        determine whether the status of the one or more measured physical quantities indicates one or more of a predetermined motion and a predetermined usage;
        in response to determining the status of the one or more measured physical quantities indicates the one or more of the predetermined motion and the predetermined usage, shift the electronic timepiece from the power saving state to the normal operation state; and
    after shifting the electronic timepiece from the power saving state to the normal operation state in response to determining the status of the one or more measured physical quantities indicates the one or more of the predetermined motion and the predetermined usage, cause the communication unit to receive updated data of the predicted positional information and current date-and-time information from the external device.

2. The electronic timepiece according to claim 1,
    wherein the processor is configured to, after shifting the electronic timepiece from the power saving state to the normal operation state in response to determining the status of the one or more measured physical quantities indicate the one or more of the predetermined motion and the predetermined usage, cause the communication unit to receive the current date-and-time information and receive the updated data of the predicted positional information after receiving the current date-and-time information.

3. The electronic timepiece according to claim 1,
    wherein the processor is configured to:
        determine whether the status of the one or more measured physical quantities indicates one or more of another predetermined motion and another predetermined usage; and
        in response to determining the status of the one or more measured physical quantities indicates the one or more of the another predetermined motion and the another predetermined usage, shift the electronic timepiece from the normal operation state to the power saving state.

4. The electronic timepiece according to claim 3,
wherein the another predetermined motion and the another predetermined usage comprises one or more of:
no input operation to an operation receiver for a set period of time; and
a display screen is still because a user has not looked at the display screen.

5. The electronic timepiece according to claim 1,
wherein the predetermined motion and the predetermined usage comprises one or more of:
an input operation to an operation receiver within a set period of time; and
a display screen is not still because a user has looked at the display screen.

6. The electronic timepiece according to claim 1,
wherein the communication unit is configured to:
perform short-range wireless communications with the external device;
in the normal operation state, maintain communication connection while the radio waves are transmittable and receivable between the electronic timepiece and the external device; and
disconnect the communication connection during the power saving state.

7. The electronic timepiece according to claim 1,
wherein the predetermined reference time is one day or less.

8. An information update control method of an electronic timepiece including:
a radio wave receiver receiving radio waves from positioning satellites;
a communication unit communicating with an external device; and
a memory storing predicted positional information on the positioning satellites, the information update control method comprising:
receiving a signal on a status of one or more measured physical quantities relevant to one or more of a motion and a usage of the electronic timepiece;
shifting the electronic timepiece between a normal operation state in which communication with the communication unit is performed and a power saving state in which the communication with the communication unit is not performed, depending on the status of the one or more measured physical quantities; and
in response to an elapsed time from a valid period of the predicted positional information exceeding a predetermined reference time during the power saving state,
determining whether the status of the one or more measured physical quantities indicates one or more of a predetermined motion and a predetermined usage;
in response to determining the status of the one or more measured physical quantities indicates the one or more of the predetermined motion and the predetermined usage, shifting the electronic timepiece from the power saving state to the normal operation state; and
after shifting the electronic timepiece from the power saving state to the normal operation state in response to determining the status of the one or more measured physical quantities indicates the one or more of the predetermined motion and the predetermined usage, causing the communication unit to receive updated data of the predicted positional information and current date-and-time information from the external device.

9. The information update control method according to claim 8, comprising:
after shifting the electronic timepiece from the power saving state to the normal operation state in response to determining the status of the one or more measured physical quantities indicate the one or more of the predetermined motion and the predetermined usage, causing the communication unit to receive the current date-and-time information and to receive the updated data of the predicted positional information after receiving the current date-and-time information.

10. The information update control method according to claim 8, further comprising:
determining whether the status of the one or more measured physical quantities indicates one or more of another predetermined motion and another predetermined usage; and
in response to determining the status of the one or more measured physical quantities indicates the one or more of the another predetermined motion and the another predetermined usage, shifting the electronic timepiece from the normal operation state to the power saving state.

11. The information update control method according to claim 10,
wherein the another predetermined motion and the another predetermined usage comprises one or more of:
no input operation to an operation receiver for a set period of time; and
a display screen is still because a user has not looked at the display screen.

12. A non-transitory computer-readable storage medium storing positional information on positional satellites and a program to cause a computer of an electronic timepiece including a radio wave receiver receiving radio waves from the positioning satellites and a communication unit communicating with an external device, to perform;
receiving a signal on a status of one or more measured physical quantities relevant to one or more of a motion and a usage of the electronic timepiece;
shifting the electronic timepiece between a normal operation state in which communication with the communication unit is performed and a power saving state in which the communication with the communication unit is not performed, depending on the status of the one or more measured physical quantities; and
in response to an elapsed time from a valid period of the predicted positional information exceeding a predetermined reference time during the power saving state,
determining whether the status of the one or more measured physical quantities indicates one or more of a predetermined motion and a predetermined usage;
in response to determining the status of the one or more measured physical quantities indicates the one or more of the predetermined motion and the predetermined usage, shifting the electronic timepiece from the power saving state to the normal operation state; and
after shifting the electronic timepiece from the power saving state to the normal operation state in response to determining the status of the one or more measured physical quantities indicates the one or more of the predetermined motion and the predetermined usage, causing the communication unit to receive updated data of the predicted positional information and current date-and-time information from the external device.

13. The electronic timepiece according to claim 1, further comprising:
a detector configured to detect the status of the one or more measured physical quantities relevant to the one or more of the motion and the usage of the electronic timepiece.

14. The electronic timepiece according to claim 13, wherein the detector comprises one or more of a push-button switch, a crown, a touchscreen, an acceleration sensor, an inclination detector and an illuminance sensor.

* * * * *